Sept. 8, 1970  L. M. McCARTY ET AL  3,526,987
CONNECTOR FOR ANIMAL IDENTIFICATION TAGS
Filed May 31, 1968  2 Sheets-Sheet 1

INVENTORS
LEO M. McCARTY
CLARENCE H. HOWE
BY Van Valkenburgh & Lowe
ATTORNEYS

Sept. 8, 1970   L. M. McCARTY ET AL   3,526,987
CONNECTOR FOR ANIMAL IDENTIFICATION TAGS
Filed May 31, 1968   2 Sheets-Sheet 2

INVENTORS
LEO M. McCARTY
CLARENCE H. HOWE
BY
Van Valkenburgh & Lowe
ATTORNEYS

United States Patent Office 3,526,987
Patented Sept. 8, 1970

3,526,987
CONNECTOR FOR ANIMAL IDENTIFICATION TAGS
Leo M. McCarty, Denver, Colo. (2583 S. Dexter St., Denver, Colo. 80222), and Clarence H. Howe, Diamond Bar Ranch S., Fork Rte., Cody, Wyo. 82414
Filed May 31, 1968, Ser. No. 733,386
Int. Cl. G09f 3/00
U.S. Cl. 40—301                    14 Claims

ABSTRACT OF THE DISCLOSURE

A connector for an animal identification tag, which is H-shaped, so that the upper portions of front and rear arms, which are connected by an upwardly bowed yoke which extends through an aperture in an ear of the animal, will clamp the ear between them whenever the lower portion of either arm is pulled away from the ear. The lower end of the rear arm has a neck and cross bar to which the identification tag may be attached, or the tag may be formed integrally with the rear arm. The front arm has a blunt point at the lower end and a flat, tapering blade, which is inserted through the slit in the ear and then pulled on through, as by a pair of pliers. A pressure plate extends laterally of the front arm, above the yoke, to shorten the front arm and provide sufficient bearing pressure for the above described clamping action.

---

This invention relates to animal identification tags used for identifying animals, such as cattle or other animals, and more particularly to a connector for attaching an animal identification tag to an ear or the like of the animal.

The animal identification tag and connector of U.S. Pat. No. 3,357,122 has been sold extensively and accomplishes to a high degree one requirement of such a connector, i.e. to provide little possibility of the tag being dislodged from the connector, or the connector from an ear or the like of the animal, through engagement with a tree lim, fence wire, brush or the like. However, such connectors require a greater length of time to install than some persons believe should be required, while the stem of the tag cannot be attached to the connector until the connector itself is installed and then requires several manipulations of connector and tag, thus requiring that the animal be restrained for an undue amount of time. In addition, there is a possibility of the connector slipping around through the slot or aperture in the ear or the like in which it is installed, with the result that the connector does not always stay in the desired position and with the resultant possibility of the connector being pulled out of the ear through rotation in a counterclockwise direction.

Among the objects of this invention are to provide a novel connector for an animal identification tag; to provide such a connector to which a tag may be attached prior to installation of the connector; to provide such a connector which is easily and quickly installed, as by inserting a portion thereof through an aperture or slit produced in the ear or the like of the animal; to provide such a connector which will maintain the position in which installed, through a clamping action on that part of the ear or the like above the aperture through which the connector extends; to provide such a connector which may be readily formed, as by molding; to provide such a connector to which the tag may be readily attached, yet is in little danger of being removed from the connector by engagement with a tree limb, fence wire, brush or the like; to provide such a connector with which, if desired, the tag may be formed integrally; and to provide such a connector which is effective and efficient in use and operation.

The foregoing and additional objects of this invention will become apparent from the description which follows, taken in conjunction with the accompanying drawings, in which.

Figure 1:
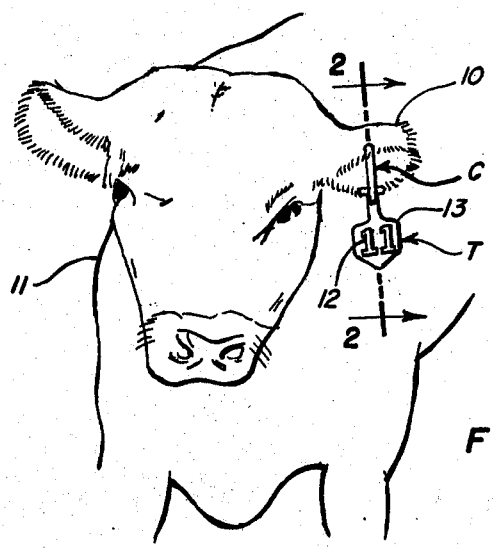
FIG. 1 is a perspective view, on a reduced scale, of a connector constructed in accordance with this invention, attached to the ear of a steer or calf and carrying an animal identification tag.
Figure 5:
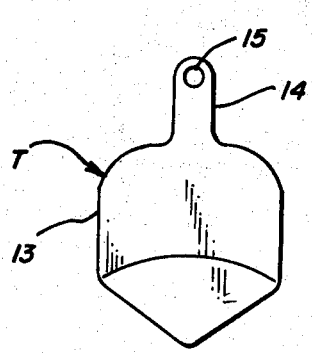
FIG. 5 is a side elevation of a tag which may be utilized with the connector of FIG. 2.

An animal identification tag T, as in FIG. 1, may be attached by a connector C, constructed in accordance with this invention, to an ear 10 of an animal 11, such as a calf or steer as shown, or other type of animal, to enable the animal to be identified from a distance, as by a number or numbers 12, or other identifying mark painted, embossed or otherwise placed on a body 13 of tag T. As in FIGS. 1 and 2, the tag is suspended from the connector C by a stem 14 having, as in FIG. 5, a hole 15 for attachment to the connector, although other ways of attaching the tag to the connector may be utilized, if desired. The tag T, as shown in FIG. 5, is constructed essentially as shown in U.S. Pat. D. 204,602. The tag T is conveniently molded from a suitable plastic, such as an opaque urethane plastic or other suitable plastic, so as to be sufficiently flexible that the tag can be bent and twisted during use. The body 13 of the tag may also have other shapes, such as that of U.S. Pat. No. 3,260,007.

Figure 2:
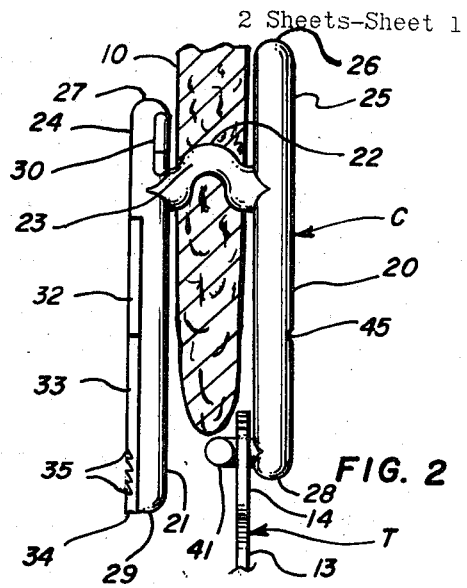
FIG. 2 is a fragmentary section, on an enlarged scale, taken along line 2—2 of FIG. 1 and showing the connector as installed in the ear of the animal, as well as a portion of the tag depending therefrom.
Figure 3:
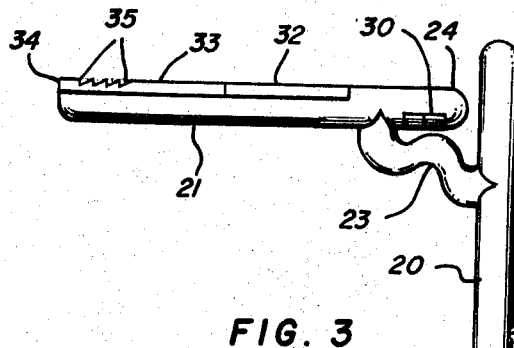
FIG. 3 is a side elevation of the connector of FIG. 2, but with one arm thereof adjusted to a position for insertion thereof through an aperture in the ear or the like of an animal.
Figure 4:
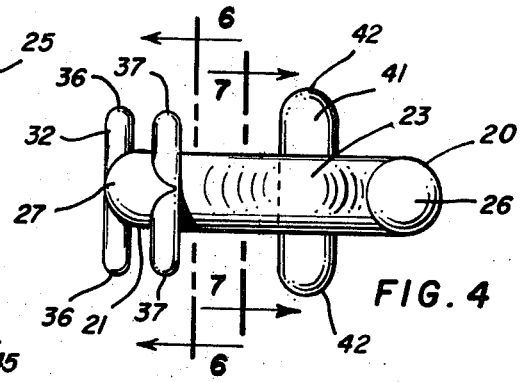
FIG. 4 is a top plan view, on a further enlarged scale, of the connector of FIG. 2.
Figure 10:
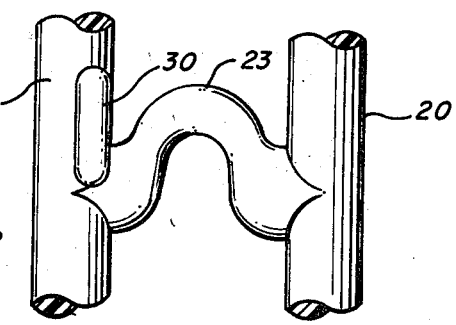
FIG. 10 is a fragmentary side elevation, on a further enlarged scale, showing a central portion of the connector of FIG. 2, and more particularly a central yoke and the adjacent portions of a pair of arms between which the yoke extends.

In accordance with this invention, the connector C may be constructed as illustrated in FIGS. 2–4, thus having a rear arm 20 from the lower end of which the tag T is suspended, and a front arm 21, which is adapted to be inserted through an aperture 22 in the ear, for installation. The arms 20 and 21 are connected at points spaced from their upper ends by a yoke 23 which remains, as in FIG. 2, in the aperture 22 of the animal's ear 10. The yoke 23 is conveniently generally circular in cross section, as in FIGS. 6 and 7, but arched or bowed upwardly and has rounded surfaces, as in FIGS. 2 and 10. The arch of yoke 23 imparts a greater flexibility, so that the connector may be grasped in one hand to cause the connector to assume the position of FIG. 3, as by placing the fourth and fifth fingers about the rear arm 20 and the thumb on top of the upper end of the front arm 21, with the index finger beneath the front arm 21 adjacent yoke 23 and the middle finger against the underside of the yoke, so as to hold the connector in the position of FIG. 3. In this position, the end of the front arm 21 may be inserted in the aperture in the ear and then quickly pulled on through, as by a pair of pliers or the like, whereupon the resilience of the tissue permits the top portion 24 of the front arm 21 to snap to the position of FIG. 2, through the resilience of the yoke 23. In the position of FIG. 2, in the event that the lower end of front arm 21 catches on brush, a tree limb, fence wire or the like and tends to be pulled forwardly, the upper portion 24 of front arm 21 above the connection thereof with yoke 23 will be pushed rearwardly against the ear 10, to clamp the ear, above the aperture, between the top portion 24 of arm 21 and the top portion 25 of rear arm 20. Similarly, if either the tag T or the lower end of rear arm 20 catches on brush, a tree limb, fence wire or the like and is pulled rearwardly, the upper portion 25 of rear arm 20 will be pushed forwardly, so as again to clamp the ear 10 between the top portions 24 and 25 of the respective arms. Thus, the connector of this invention is substantially H-shaped, in order to provide the above described clamping action, between the top portions of the front and rear arms, thereby overcoming to a marked degree the problem of the connector either slipping around in the aperture in the ear or being pulled out of the ear.

The upper end 26 of the rear arm and the upper end 27 of the front arm 21 are preferably hemispherical, with the arms being cylindrical, to minimize the possibility of the upper end of either arm catching on brush, a tree limb, fence wire or the like. The lower end 28 of the rear arm 20 is similarly hemispherical, while lower end 29 of front arm 21 is generally hemispherical. To increase the bearing surface of the upper portion 24 of the front arm 21, but still leave this upper portion 24 sufficiently short to permit insertion of the front arm 21 through aperture 22 in the ear, for installation, a generally flat, spade-shaped plate 30 is formed integrally with the rear upper portion 24 of the front arm above the yoke 23. The connector C is formed, as by molding, from a suitable tough, resilient material, such as a polyurethane.

Figure 6:
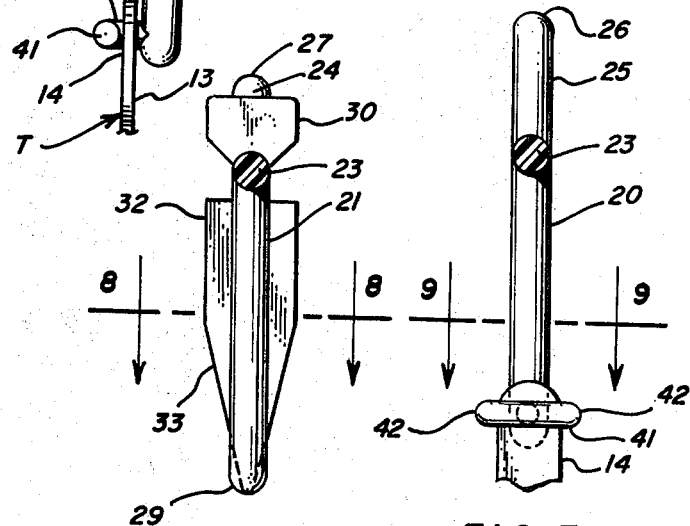
FIG. 6 is a vertical section, on a slightly reduced scale, taken along line 6—6 of FIG. 4 and showing particularly a front arm of the connector.
Figure 7:
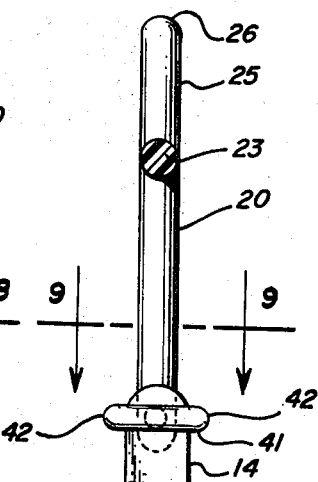
FIG. 7 is a vertical section, on a slightly reduced scale, taken along line 7—7 of FIG. 4 and showing particularly a rear arm of the connector.
Figure 8:
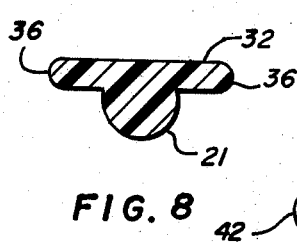
FIG. 8 is a transverse section, on an enlarged scale, taken along line 8—8 of FIG. 6.

To facilitate insertion of the front arm 21 through the slit formed in the ear, as by a knife, a blade 32, which is wider than the front arm 21, is formed integrally with the front arm 21 on the front surface thereof, with the lower portion 33, as in FIG. 6, tapering to a blunt point 34 at the generally hemispherical lower end 29 of the front arm. To assist in gripping the end of the lower arm by a suitable tool, such as a pair of pliers, for pulling the lower arm through the slit in the ear rapidly, a series of transverse serrations 35, as in FIGS. 2 and 3, may be provided in blade 32 adjacent the lower end thereof. As in FIG. 6, the maximum width of blade 32 corresponds to the maximum width of pressure plate 30, so that, as the slit is spread by blade 32, the plate 30 can follow quite readily. The lateral edges 36 of blade 32, as in FIG. 4, are preferably rounded, as shown, as are the corresponding lateral edges 37 of pressure table 30.

Figure 9:
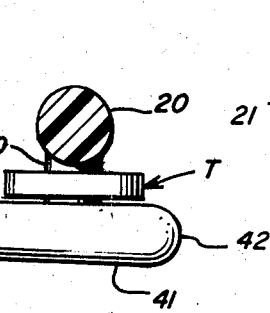
FIG. 9 is a transverse section, on an enlarged scale, taken along line 9—9 of FIG. 7.

The tag T is attached to the rear arm 20 of connector C in a suitable manner, preferably so that it can pivot or swing from side to side under pressure, but cannot readily be twisted or pulled off. A preferred attachment means for this purpose includes a cylindrical neck 40, which extends forwardly from the lower end of rear arm 20, with which it is formed integrally, and has a diameter corresponding to or slightly greater than hole 15 in stem 14 of the tag T, together with a cross bar 41 which extends laterally to each side of neck 40, as in FIGS. 4, 7 and 9. Cross bar 41 preferably has hemispherical ends 42, not only to reduce the possibility of the cross bar catching on a tree limb, fence wire, brush or the like, but also to facilitate the attachment of tag T to the connector. For the latter, hole 15 is threaded onto one end 42 of cross bar 41, then stretched around the opposite end of the cross bar, whereupon hole 15 will snap onto neck 40. As will be evident, the upper end of stem 14 of tag T, around hole 15, is protected from engagement with anything which might tend to pull the tag off the connector by the cross bar 41 and also rear arm 20, while a downward or lateral pull on tag T will not cause the tag T to be removed from the connector. Of course, if the tag T becomes entangled in such a manner that it is pulled rearwardly and the tag is stretched, so that the hole 15 tends to ride around the lower end 28 of rear arm 20, the tag will still be attached to the connector. Also, the cross bar 41 will resist any tendency for the tag T to be pulled forwardly off the connector.

As illustrated, the arm to which the tag T is connected is referred to as the rear arm, while the opposite arm is referred to as the front arm, because the relation shown is preferred. However, the connector C may be placed in an ear or the like in the opposite direction, if desired, since the clamping action of the H-shaped connector will still be obtained and the cross bar 42 will again prevent the tag T from being pulled off the connector.

The rear arm 20, as on its rear side, may be provided with a notch 45 as a marking point for cutting off the lower portion of the rear arm, when the connector itself is to be used for identification purposes, as by placing identifying marks on the front of blade 32. This may be desirable when the connector of this invention is used as a tag for identifying smaller animals.

In the alternative construction of an animal identification tag connector of this invention, illustrated in FIGS. 11–15, the rear arm 20, having an upper portion 25, hemispherical upper and lower ends 26 and 28, respectively, and provided at its lower end with a forwardly facing neck 40 and a cross bar 41 for attachment of stem 15 of tag T, may be constructed in the same manner as described previously. However, the remainder of the tag, including a ribbon-like, upwardly bowed yoke 50 and a front arm 51, may be flat, as shown, with the upper portion 52 of the front arm, above a pair of notches 53 in the opposite sides of the front arm, providing a clamping surface similar to the bearing plate 30 of FIG. 6. Below notches 53, the sides of front arm 51 taper slightly inwardly to a wedge-shaped lower portion 54 terminating in a blunt point 55. A series of transverse ridges 56 having 90 degree upper edges and downwardly slanting lower edges, as in FIG. 11, may be provided on lower portion 54, again to facilitate gripping the lower end of front arm 51, as by a pair of pliers, in pulling the front arm 51 rapidly through a slit in the ear. The front arm 51 may be reinforced by a pair of spaced, semicircular ridges 57 extending longitudinally of the front arm 51 and both above and below yoke 50, ridges 57 being rounded at their upper ends and the lower ends terminating coextensively with the wedge-shaped lower portion 54 of the front arm.

Figure 11:
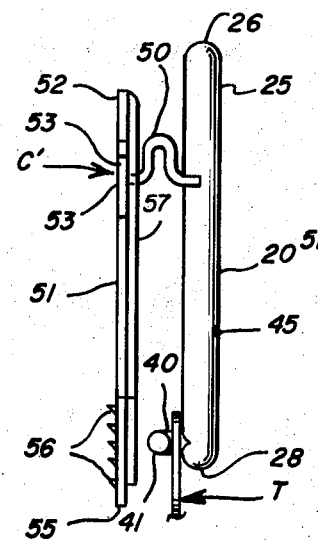
FIG. 11 is a side elevation of an alternative embodiment of an animal identification tag connector of this invention.
Figure 12:
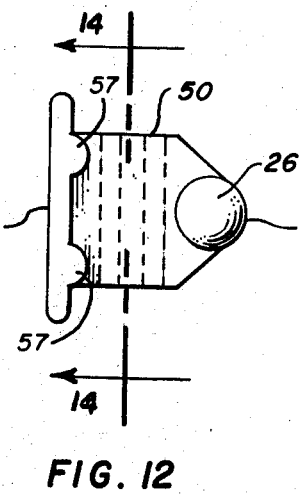
FIG. 12 is a top plan view, on an enlarged scale, of the connector of FIG. 11.
Figure 13:
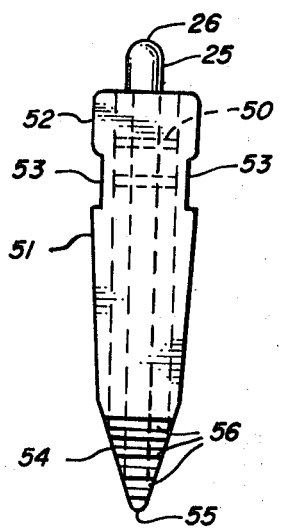
FIG. 13 is a front elevation of the connector of FIG. 11.
Figure 14:
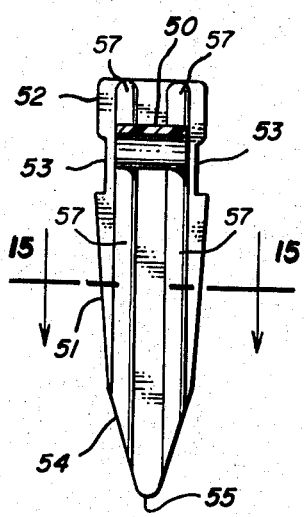
FIG. 14 is a vertical section, but on a reduced scale, taken along line 14—14 of FIG. 12.
Figure 15:
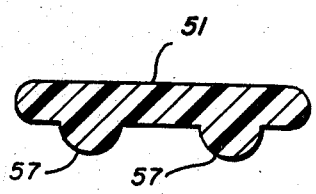
FIG. 15 is a transverse section, on an enlarged scale, taken along line 15—15 of FIG. 14.

As will be evident, the connector C' of FIG. 11 may be held in a position corresponding to connector C, as shown in FIG. 3, for insertion of the lower end of the front arm 51 through a slit in the animal's ear, then pulling the front arm rapidly through the ear and permitting the front arm to snap back to a position parallel to the rear arm.

Figure 16:
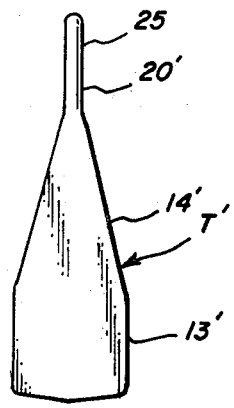
FIG. 16 is a fragmentary rear elevation showing the lower portion of a rear arm of a connector constructed as shown in either FIG. 2 or FIG. 11, with the tag being formed integrally with such rear arm.

As illustrated in FIG. 16, a tag T' may be formed integrally with the connector of this invention, as with a rear arm 20', which is similar to the rear arm 20 of each of the embodiments previously described, but which merges with an outwardly and downwardly tapering, flat stem 14' which is integral with a flat body 13' on which identification numbers, letters or other types of identification marks may be placed.

Although more than one embodiment of this invention has been illustrated and described, it will be understood that still other embodiments may exist and that various changes and variations may be made, all without departing from the spirit and scope of this invention.

What is claimed is:

1. In a connector for an animal identification tag:
a pair of spaced arms adapted to extend downwardly on opposite sides of an ear or the like of said animal;
a yoke connecting said arms and adapted to extend through an aperture in said ear or the like; and
each said arm extending above said yoke at least a distance greater than the thickness of said ear and being pivotal toward and away from said ear, whereby a force tending to move the lower portion of either arm away from the corresponding side of said ear will tend to cause the portions of said arms above said yoke to clamp said ear, said arms being sufficiently rigid to perform such clamping.

2. In a connector as defined in claim 1, including: means for suspending a separate identification tag from one of said arms.

3. In a connector as defined in claim 2, wherein: the other of said arms is provided with a transverse plate above said yoke for bearing against the corresponding side of said ear during clamping.

4. In a connector as defined in claim 1, wherein: one of said arms is generally cylindrical and is provided at its lower end with means for suspending a separate identification tag.

5. In a connector as defined in claim 1, wherein: said yoke is upwardly bowed.

6. In a connector as defined in claim 5 wherein: said yoke is generally circular in cross section.

7. In a connector as defined in claim 5, wherein: said yoke is ribbon-like in a direction transverse to said arms.

8. In a connector as defined in claim 1, wherein: said identification tag is integral with the lower end of one of said arms.

9. In a connector as defined in claim 1, wherein:
one said arm is cylindrical and provided with hemispherical upper and lower ends, with a forwardly extending neck adjacent the lower end, for receiving a hole in a stem of an identification tag, and a transverse, cylindrical cross bar integral with said neck and having hemispherical ends disposed laterally beyond said neck;
said yoke is upwardly bowed and is generally circular in cross section, with rounded surfaces merging into said front and rear arms;
the other said arm is generally cylindrical and has a hemispherical upper end and a generally cylindrical lower end, with a transverse, integral pressure plate extending laterally to each side adjacent and above said yoke, said pressure plate having rounded edges;
the other said arm is provided with an integral blade on the surface thereof opposite and below said yoke, said blade having a flat surface and a downwardly tapering lower portion terminating in a lower blunt end disposed at said lower end of said cylindrical portion; and said blade is provided with a plurality of transverse serrations adjacent the lower end thereof.

10. In a connector as defined in claim 1, wherein:
one said arm is cylindrical and provided with hemispherical upper and lower ends, with a forwardly extending neck adjacent the lower end for receiving a hole in a stem of an identification tag, and a transverse, cylindrical cross bar integral with said neck having hemispherical ends disposed laterally beyond said neck;
said yoke is upwardly bowed and is generally flat;
the other said arm is generally flat and provided with a notch at each side adjacent said yoke, the upper portion of said other arm above said yoke forming a pressure plate and the portion of said other arm below said yoke forming a blade having a downwardly tapering lower portion terminating in a blunt point, with a series of transverse ribs extending laterally across the lower portion; and
said other arm is provided on the side facing said one arm with a pair of upright, integral, rounded ribs.

11. In a connector for an animal identification tag:
a pair of spaced arms adapted to extend downwardly on opposite sides of an ear or the like of said animal;
a yoke connecting said arms and adapted to extend through an aperture in said ear or the like;
each said arm extending above said yoke, whereby a force tending to move the lower portion of either arm away from the corresponding side of said ear will tend to cause the portions of said arms above said yoke to clamp said ear;
means for suspending a separate identification tag from one of said arms; and
the other of said arms being provided with a blade having a tapering lower portion and a blunt lower end.

12. In a connector as defined in claim 11, wherein: said blade is integral with an arm having a generally circular cross section.

13. In a connector as defined in claim 11, wherein: said blade is provided with at least one longitudinally extending, reinforcing rib.

14. In a connector for an animal identification tag:
a pair of spaced arms adapted to extend downwardly on opposite sides of an ear or the like of said animal;
a yoke connecting said arms and adapted to extend through an aperture in said ear or the like;
each said arm extending above said yoke, whereby a force tending to move the lower portion of either arm away from the corresponding side of said ear will tend to cause the portions of said arms above said yoke to clamp said ear; and
means for suspending a separate identification tag from one of said arms, including a neck extending from a point adjacent the lower end of one said arm and toward the opposite arm and a bar extending transversely to said neck and beyond said neck on either side thereof.

References Cited

UNITED STATES PATENTS 3,334,434   8/1967   Melin _____ 40—301

WILLIAM H. GRIEB, Primary Examiner